(12) United States Patent
Gleim et al.

(10) Patent No.: US 6,978,843 B2
(45) Date of Patent: Dec. 27, 2005

(54) WELL CONFIGURATION AND METHOD OF INCREASING PRODUCTION FROM A HYDROCARBON WELL

(75) Inventors: Robert Alan Gleim, Royersford, PA (US); Changhui Zhu, Malvern, PA (US)

(73) Assignee: Polyflow, Inc., Oaks, PA (US)

( * ) Notice: Subject to any disclaimer, the term of this patent is extended or adjusted under 35 U.S.C. 154(b) by 152 days.

(21) Appl. No.: 10/427,824

(22) Filed: May 1, 2003

(65) Prior Publication Data

US 2004/0035584 A1     Feb. 26, 2004

Related U.S. Application Data

(60) Provisional application No. 60/405,620, filed on Aug. 23, 2002.

(51) Int. Cl.$^7$ ................................... E21B 7/20
(52) U.S. Cl. ................ 166/384; 166/304; 166/242.1
(58) Field of Search .................. 166/304, 313, 166/369, 311, 242.1, 242.3, 242.4

(56) References Cited

U.S. PATENT DOCUMENTS

| | | | | |
|---|---|---|---|---|
| 4,793,409 A | * | 12/1988 | Bridges et al. | 166/57 |
| 5,282,263 A | * | 1/1994 | Nenniger | 392/301 |
| 6,454,010 B1 | * | 9/2002 | Thomas et al. | 166/369 |
| 6,523,615 B2 | * | 2/2003 | Gandy et al. | 166/381 |
| 6,527,056 B2 | * | 3/2003 | Newman | 166/384 |

* cited by examiner

*Primary Examiner*—Frank S. Tsay
(74) *Attorney, Agent, or Firm*—Volpe and Koenig, P.C.

(57) ABSTRACT

A well configuration and method of increasing production from a hydrocarbon well having pre-existing production tube. A composite velocity string having an outer diameter smaller than the inner diameter of the production tube is installed in the production tube so that an annular gap is formed between the outer surface of the velocity string and the inner surface of the production tube. Production from the well is increased because the coefficient of fluid flow friction through the composite velocity string, and the amount of heat loss through the composite velocity string, are reduced compared to a steel velocity string. Installation efficiency is also increased because the composite velocity string is much lighter than a steel velocity string.

28 Claims, 3 Drawing Sheets

WELL CONFIGURATION AND METHOD OF INCREASING PRODUCTION FROM A HYDROCARBON WELL

CROSS-REFERENCE TO RELATED APPLICATIONS

This is a nonprovisional application claiming priority to provisional application No. 60/405,620 filed Aug. 23, 2002, incorporated herein by reference.

FIELD OF INVENTION

The present invention relates to a well configuration and a method of increasing production from a hydrocarbon well using a composite velocity string.

BACKGROUND OF THE INVENTION

Hydrocarbon wells usually comprise an exterior steel casing, which prevents the bore from collapsing, and an interior pipe or "production tube", which conveys the natural gas or petroleum to the surface of the well. The production tube is suspended within the casing by a collar that connects the top of the production tube to the top of the casing. The collar positions the production tube concentrically within the casing so that an annular gap is formed between the exterior of the production tube and the interior of the casing.

Over the life-span of a hydrocarbon well, the gradual reduction in well pressure causes a corresponding reduction in the exit velocity of the natural resource from the well through the production tube. In addition to reducing the productivity of the well, a reduction in the exit velocity below a critical value permits vaporized acids within natural gas to condense on the interior surface of the production tube.

After the exit velocity drops below an acceptable level, production from the well is boosted by inserting a reduced-diameter, co-axial velocity string within the production tube. Over the course of time, several additional reduced-diameter velocity strings may be installed until the well is tapped out.

Due to the highly-corrosive nature of oil and natural gas, and the inherently harsh subterranean conditions deep within the well, velocity strings must be made of a material having high corrosion resistance. Due to the high pressure of the fluids contained in the well, and the excessive weight of extreme lengths of the velocity string, the velocity string must also be made of a material having high strength. Therefore, it would be desirable to provide a velocity string having good corrosion resistance and good tensile and radial strength.

It is known to make velocity strings from high-strength carbon steel, such as AISI A606 and 4130. However, high-strength carbon steel offers relatively low corrosion resistance to hydrocarbons and subterranean environments. Over time, corrosion not only adversely effects the structural integrity of the velocity string, but also adversely effects the coefficient of fluid flow friction through the velocity string. For example, rust and scale formation on the interior of the velocity string increase fluid flow friction losses through the string. As a result, high-strength steel velocity strings must be replaced in as little as 9–12 months from installation. Therefore, it would be desirable to increase production from a hydrocarbon well by reducing corrosion and scale formation on the interior of the velocity string.

In a hydrocarbon well, tar, asphalt and other impurities have a tendency to adhere to the interior of the velocity string. Over time, the accumulation of such impurities also adversely effect the coefficient of fluid flow friction through the string. Therefore, it would also be desirable to increase production from a hydrocarbon well by reducing accumulation of tar, asphalt and other hydrocarbon impurities on the interior of the velocity string.

As natural gas cools during transport through the string to the surface, the gas condenses and forms caustic condensation acids, which corrode the velocity string and increase well back pressure. Therefore, it would also be desirable to increase production from a hydrocarbon well by reducing reduce heat loss through the velocity string so that natural gas condensation is also reduced.

Common steel velocity strings are also very heavy and require the use of expensive, special equipment during installation. For example, a high tonnage crane is often needed to lift the steel supply coil, which may weigh in excess of 20 tons. At off-shore wells, specialized barges are needed to carry to the rig both the steel supply coil and a high tonnage crane. Therefore, it would be desirable to increase productivity from a hydrocarbon well by providing a velocity string which is lighter and less costly to install than a steel velocity string.

SUMMARY OF THE INVENTION

The present provides a well configuration and a method of increasing production from a hydrocarbon well having pre-existing production tube. A composite velocity string is installed in the production tube. The composite velocity string has an outer diameter smaller than the inner diameter of the production tube so that an annular gap is formed between the outer surface of the velocity string and the inner surface of the production tube.

The composite velocity string is installed by inserting the velocity string along the length of the production tube and hanging the velocity string from the well head using a hanger. Preferably, the velocity string is inserted using an injection tube unit.

Depending on the pressure of the well, a packer may be installed at the bottom of the velocity string to isolate the annular gap. The packer reduces radially-inward pressure on the velocity string by isolating the annular gap from the production zone of the well.

The composite velocity string comprises a continuous, extruded, polymeric tube and a layer of reinforcement fibers surrounding the tube. The fibers preferably include a first plurality of reinforcement fibers that extend both axially and radially, and a second plurality of the fibers that extend only axially.

In one embodiment, the polymeric tube comprises a multi-layer, extruded, tube, including an interior barrier layer comprising polyphenylene sulfide, an exterior support layer comprising polyamide, and an intermediate layer binding the interior layer and the exterior layer to one another. The interior barrier layer comprises polyphenylene sulfide compounded with an ethylene/glycidyl methacrylate copolymer. The intermediate binding layer comprises ethylene/glycidyl methacrylate copolymer. The exterior support layer comprises polyamide compounded with an ethylene/glycidyl methacrylate copolymer.

In this embodiment, the barrier layer comprises polyphenylene sulfide compounded with about 10 to about 30 percent ethylene/glycidyl methacrylate copolymer. The exterior supporting layer comprises polyamide compounded with about 10 to about 30 percent ethylene/glycidyl methacrylate copolymer. The thickness of the individual layers of the polymeric tube will vary depending on their overall size. The ratio of the thickness of the support layer to the barrier layer should preferably be greater than 1 to 1. The thickness of the binding layer should be minimized, and should be less than 0.020 in., preferably about 0.002 to about 0.020 in.

In another embodiment, the polymeric tube is a single-layer, extruded tube formed from a thermoplastic material such as polyamide or polyphenylene sulfide. Preferably, the composite velocity string also includes an outer jacket surrounding the reinforcement fibers. The jacket is preferably formed from a thermoplastic material such as polyamide or polyphenylene sulfide.

The reinforcement fibers of the velocity string include a first plurality of cross-braided reinforcement fibers that extend both axially and radially, and a second plurality of fibers that extend only axially. The reinforcement fibers comprise continuous filaments of high strength, weavable, braided, synthetic cordage such as aramid yarns sold under the marks Kevlar® and Twaron®.

In accordance with the method of the present invention, the coefficient of fluid flow friction through the composite velocity string is greatly reduced compared to a steel velocity string for several reasons. The polymeric tube of the velocity string has a coefficient of fluid flow friction that is much lower than a steel string, even in its new condition. Further, the polymeric tube has greater corrosion resistance, greater resistance to scale formation, and is less adherent to hydrocarbon impurities, such as tar and asphalt, than steel strings. Therefore, fluid flow friction losses are greatly reduced.

In accordance with the method of the present invention, formation of caustic condensation acids in the composite string is also reduced compared to a steel velocity string by reducing heat loss through the composite string. The composite velocity string has a thermal conductivity coefficient that is far lower than the thermal conductivity coefficient of a steel string. Further, the annular gap surrounding the composite string provides an additional insulating barrier.

The composite velocity string is also much lighter than a steel velocity string. Therefore, the composite velocity string can be installed without special equipment or heavy cranes are required to install steel strings.

DETAILED DESCRIPTION OF PREFERRED EMBODIMENTS

Figure 1:
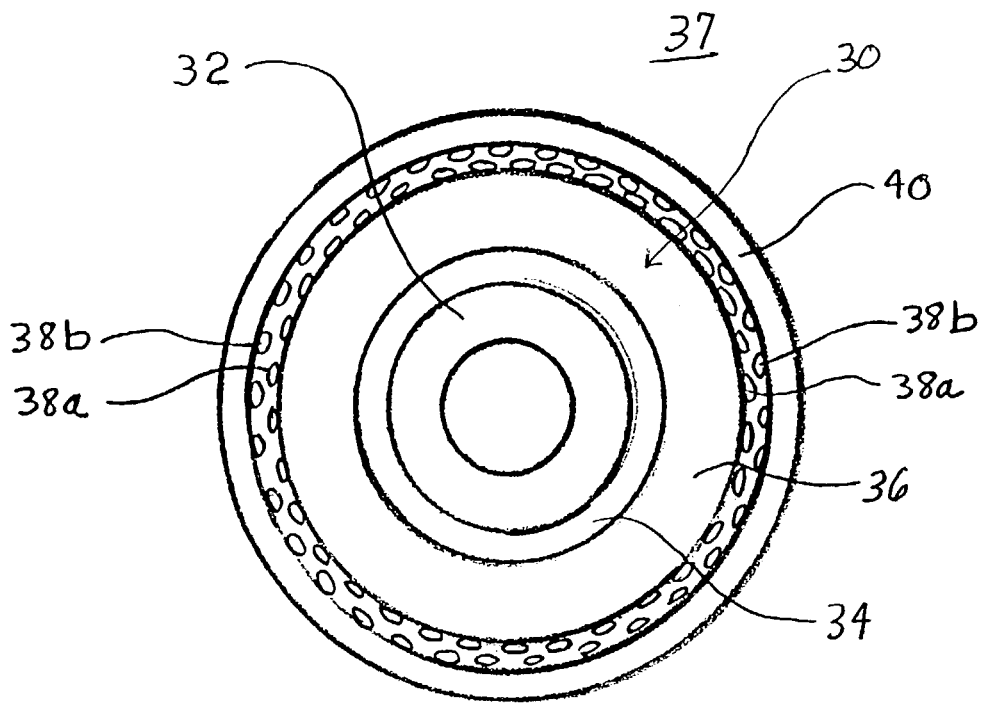
FIG. 1 is a cross-sectional view of a velocity string that is installed in a hydrocarbon well to increase production from the well in accordance with an embodiment of the invention.

Reference is made to the accompanying drawings wherein like reference numerals are used throughout to designate like elements. As used herein, the term "percent" shall mean percent by weight.

Figure 2:
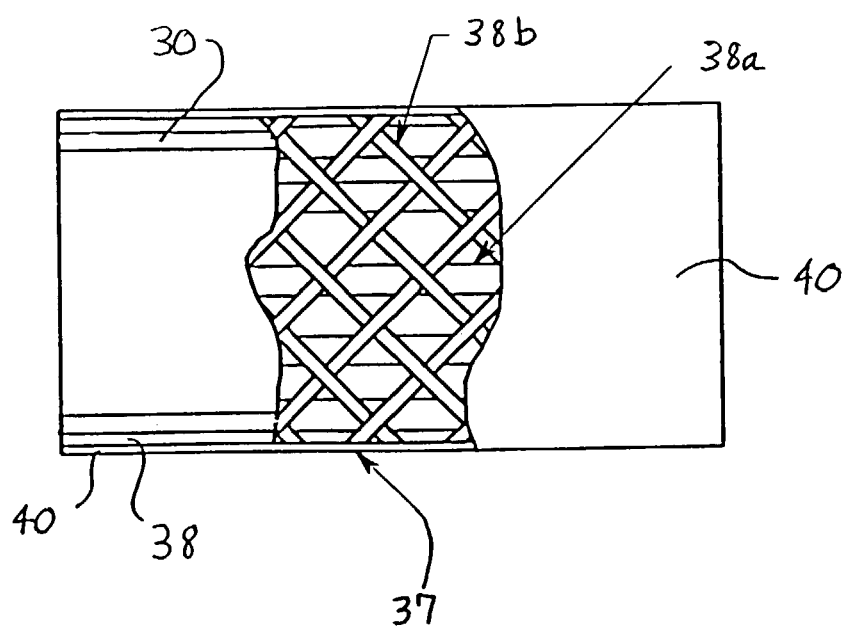
FIG. 2 is a partial cross-sectional, partial broken side elevational, partial side elevational view of the velocity string shown in FIG. 1.

A composite velocity string that is installed in a hydrocarbon well to increase production from the well in accordance with an embodiment of the invention is shown in FIGS. 1 and 2, and is designated generally be reference numeral 37. The velocity string 37 comprises a continuous extrusion of multi-layer tubing 30, a plurality of reinforcement fibers 38 surrounding the tubing 30, and an outer jacket 40 surrounding the reinforcement fibers 38.

The multi-layer tubing 30 has an interior barrier layer 32, an intermediate binding layer 34, and an exterior support layer 36. The ratio of thicknesses of the individual layers shown in FIGS. 1 and 2 is merely for illustrative purposes and is not representative of the actual thickness ratios of the tubing in accordance with the preferred embodiments.

The barrier layer 12 is formed from a material that is resistant to corrosion by chemicals and hydrocarbons such as natural gas and petroleum. In a preferred embodiment, the barrier layer 12 is formed from polyphenylene sulfide compounded with ethylene/glycidyl methacrylate copolymer. Polyphenylene sulfide is used because it has good chemical corrosion resistance, and has a very low permeation to most chemicals including hydrocarbons. Preferably, the polyphenylene sulfide is compounded with about 10 to about 30 percent ethylene/glycidyl methacrylate copolymer. Both polyphenylene sulfide and ethylene/glycidyl methacrylate copolymer are commercially available polymer resins.

The support layer 16 is formed from a material that has improved strength and a lower cost than polyphenylene sulfide. In a preferred embodiment, the exterior layer comprises polyamide compounded with ethylene/glycidyl methacrylate copolymer. Polyamide is used because it is a low cost engineering polymer with balanced mechanical properties. Preferably, polyamide is compounded with about 10 to about 30 percent ethylene/glycidyl methacrylate copolymer. Polyamide is also a commercially available polymer resin.

The intermediate layer 14 comprises ethylene/glycidyl methacrylate copolymer. Normally, polyphenylene sulfide and polyamide can not be bound or even adhered to one another. The use of ethylene/glycidyl methacrylate copolymer as an intermediate binding layer 14, and as a compounding element of the polyphenylene sulfide layer 12 and polyamide layer 16, allows the layers 12,16 to be bound to one another.

In a preferred embodiment of the invention, polyphenylene sulfide and ethylene/glycidyl methacrylate copolymer are compounded using a single screw or twin-screw compounding line which includes a compounding extruder and a pelletizer. Polyphenylene sulfide and ethylene/glycidyl methacrylate copolymer can be pre-mixed or meter fed into the extruder in the ratios described above. Preferably, the temperature of the extruder and die is about 450 to about 600° F. After extrusion, the compound is pelletized for use in a subsequent extruding process that forms the multi-layer tubing 30.

In a preferred embodiment of the invention, polyamide and ethylene/glycidyl methacrylate copolymer are compounded using a twin-screw compounding line that includes a compounding extruder and a pelletizer. Polyamide and ethylene/glycidyl methacrylate copolymer can be pre-mixed or meter fed into the extruder in the ratios described above. Color pigment or a nylon base color concentrate can be introduced if desired. Preferably, the temperature of the extruder and die is about 400 to about 600° F. After extrusion, the compound is pelletized and dried for use in a subsequent extrusion process that forms the multi-layer tubing 30.

The multi-layer tubing 30 is formed using the co-extrusion process described below. The material is extruded so that the polyphenylene sulfide forms the interior barrier layer 32 and the polyamide forms the exterior support layer 36 of the tubing.

The thickness of the individual layers of the multi-layer tubing will vary depending on the overall size of the velocity string 37. For the best balanced properties of high chemical resistance, low chemical and gas permeation to hydrocarbons, high axial and radial strength, and low cost, the thickness ratio of the exterior support layer 36 to the interior barrier layer 32 should preferably be greater than 1 to 1. The thickness of the binding layer 34 should be minimized, and should be less than about 0.020 in., preferably about 0.002 to about 0.020 in. For practical applications, the support layer should be at least about 0.030 in. thick and the barrier layer should be at least about 0.001 in. thick.

The velocity string 37 has both axially-extending fibers 38a and cross-braided fibers 38b. The reinforcement fibers 38 provide increased tensile and radial strength. The layer of reinforcement fibers 38 is preferably formed in a continuous co-extrusion process, with the axial and cross-braided fibers being introduced into the extruding process so that they are captured and held in position between the tubing 30 and the jacket 40.

In the embodiment shown in FIGS. 1 and 2, the axially-extending fibers 38a comprise continuous filaments of a high-strength, braided, synthetic cordage such as the aramid yarns sold under the marks Kevlar® or Twaron®. However, those skilled in the art will appreciate that other fibers can be used in combination with or as a replacement for the aramid yarns. The fibers should be loosely packed to allow some slippage, which allows the string 37 to bend without kinking.

Referring to FIG. 2, the axially-extending fibers 38a extend along the length of the velocity string 37. The axially-extending fibers 38a increase the axial tensile strength of the velocity string 37, and prevent necking when extremely long lengths, e.g., 5000 feet or more, of string 37 are suspended in the well. In the embodiment shown in FIGS. 1 and 2, the fibers 38a are applied over the exterior support layer 32 of the tubing 30 during extrusion.

The cross-braided fibers 38b extend around the periphery of the tubing and are applied over the axially-extending fibers 38a. The cross-braided fibers 38b increase the radial tensile or hoop strength of the tubing 30 to resist outward pressure from the fluid contained within the tubing 30. In the embodiment shown in FIGS. 1 and 2, the cross-braided fibers also comprise continuous filaments of high-strength, braided, synthetic cordage such as the aramid yarns sold under the marks Kevlar® or Twaron®. The cross-braided fibers 38b are preferably applied over the axially-extending fibers 38a during extrusion.

The outer jacket 40 is formed from a material that has improved strength and a lower cost than polyphenylene sulfide, and can withstand long term exposure to underground conditions. Selection of the jacket material is also based on the chemical resistance needed for the particular well. In a preferred embodiment, the jacket 40 comprises a high strength polymeric material such as the polyamide material sold under the mark Nylon®. Alternatively, the jacket 40 may be formed from a material having good corrosion resistance such as the polyphenylene sulfide material sold under the mark Fortron®. A blend of materials may also be used to form the jacket. For "sweet" wells containing relatively low amounts of corrosive impurities, the preferred material is Nylon®. For "sour" wells containing deleterious amounts of corrosive impurities, the preferred jacket material is Fortron®.

The outer jacket 40 is preferably at least about 0.030 in. thick to prevent damage to the reinforcement fibers 18 during installation. In general, the outer jacket 40 may be thicker than 0.030 in. to provide a smooth exterior surface, which enhances installation into the well. The outer jacket 40 is preferably applied over the reinforcement fibers 38 during extrusion.

It is preferred that the weave density of the reinforcement fibers 38 be sufficient to prevent bonding between the outer jacket 40 and the exterior of the tubing 30, except for weak mechanical contacts at the interstitial gaps in the fabric pattern. If significant bonding between the jacket 40 and the tubing 30 occurs, the reinforcement fibers 38 will be prevented from shifting when the pipe is bent, thereby causing the pipe to kink rather than to bend.

The outer diameter of the velocity string preferably ranges from about 1.0 in. to about 2.375 in. The thickness of each layer varies based on the diameter of the pipe tubing 30. The diameter of the tubing 30 is selected so that the string 37 may be coiled and handled easily without kinking.

The tubing 30 is preferably made using a co-extrusion process. The process preferably utilizes three extruders, which can be single screw extruders and/or twin screw extruders.

The first extruder melts and extrudes the compound of polyphenylene sulfide and ethylene/glycidyl methacrylate copolymer to form the barrier layer. Preferably, the first extruder operates at about 450 to about 600° F. and at about 2,000 to about 7,000 p.s.i.

The second extruder melts and extrudes the compound of polyamide and ethylene/glycidyl methacrylate copolymer to form the supporting layer. Preferably, the second extruder operates at about 400 to about 600° F. and at about 1,000 to about 7,000 p.s.i.

The third extruder melts and extrudes ethylene/glycidyl methacrylate copolymer to form the intermediate binding layer. Preferably, the third extruder operates at about 350 to about 570° F., and at about 500 to about 3,000 p.s.i. On all three extruders, the temperature range of the die is about 450 to about 650° F.

While the velocity string 37 has been described above with particular application to hydrocarbon transport, those skilled in the art will appreciate that the velocity string 37 may be used to transport a variety of pressurized corrosive fluids. However, it is recommended that the velocity string 37 not be used to transport products that will experience environmental conditions in excess of about 250° F. Above about 250° F., the bond between the barrier layer and support layer begins to weaken.

Figure 3:
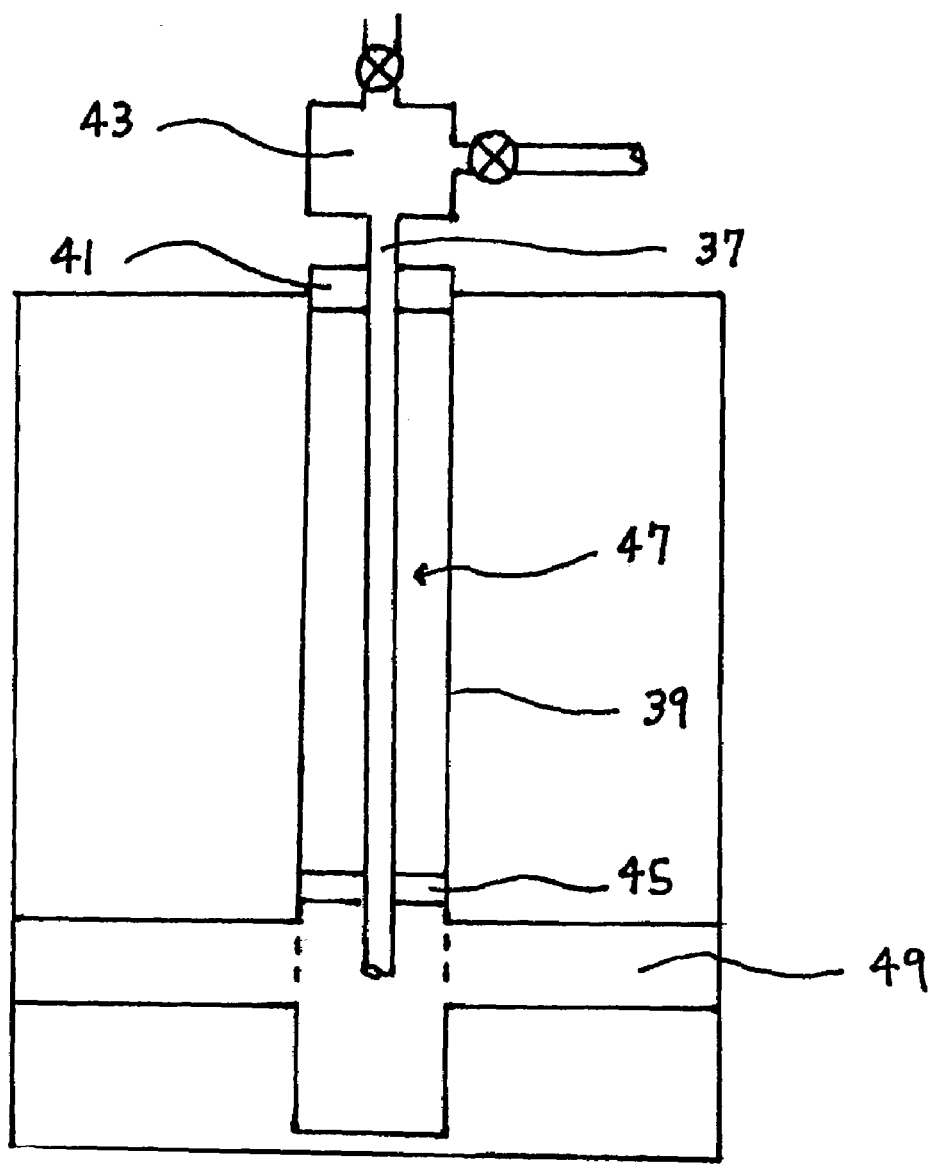
FIG. 3 is a cross-sectional view of a well-configuration in accordance with an embodiment of the invention.

Referring to FIG. 3, a well configuration is shown in which the velocity string 37 is installed in the production tube 39 of a subterranean hydrocarbon well. The outer diameter of the velocity string 37 is smaller than the inner diameter of the production tube 39 so that an annular gap is formed there between. The velocity string 37 is preferably supplied on a large reel and installed using a known injection tube unit such as model HR-560 sold by Hydra Rig, Fort Worth, Tex. The velocity string 37 is supported in the production tube using a known hanger such as the model RH2 sold by Wellhead Control Products, Pasadena, Tex. and is connected in a known manner to the well head 43.

If the velocity string is to be installed in a high pressure well, a packer 45 is installed at the bottom of the well. The packer 45 isolates the annular gap 47 between the production tube 39 and the velocity string 37. High pressure natural resources in the production zone 49 near the bottom of the well bore can freely flow into the bottom of the velocity string but are prevented from entering the annular gap 47, thereby preventing high pressure fluids in the annular gap 47 from radially collapsing the velocity string 37. The packer 45 can be selected from known hydraulic, mechanical or electrical packers.

The well pressure at which a packer 45 should be installed varies depending on the diameter of the velocity string. For example, for a 2⅜ in. velocity string, a packer 45 should be used if the well pressure exceeds about 100 p.s.i. In contrast, for a 1¼ in. velocity string, a packer 45 should be used if the well pressure exceeds about 500 p.s.i.

In comparison to conventional steel velocity strings, installation and use of the composite velocity string 37 of the present invention increases production from the well for several reasons. First, friction losses through the velocity string 37 are reduced because the polymeric inner tube 30 of the composite string 37 has a coefficient of friction which is about ⅓ less than a new steel string.

Second, steel is prone to rust and scale accumulation, which further increases friction losses in a steel string. By comparison, the polymeric interior tube 30 of the polymeric velocity string 37 has much higher corrosion resistance to oil and natural gas.

Third, tar, asphalt and other hydrocarbon impurities are less likely to adhere to the polymeric interior tube 30 of the velocity string 37 than a steel string. Less tar and asphalt accumulation further reduces friction losses.

Fourth, as natural gas cools during its approach to the surface, the gas condenses and forms caustic condensation acids, which corrode the velocity string 37 and increase well back pressure. The polymeric velocity string 37 provides greater thermal insulation compared to a steel velocity string. For example, the composite velocity string 37 has a thermal conductivity coefficient that is about 200 times lower than the thermal coefficient of steel. The annular gap 47 also provides an insulating boundary for the velocity string 37. Because the composite velocity string 37 reduces heat loss, condensation of natural gas is also reduced.

The polymeric velocity string 37 of the present invention also reduces the cost associated with installing a steel velocity string since the composite velocity string 37 is as much as 85% lighter than an equivalently sized steel velocity string. Since the composite velocity string 37 is much lighter, and since the composite velocity string 37 is significantly more flexible than steel strings, the composite velocity string 37 can be installed without special equipment or heavy cranes that were previously required to install steel strings. Additionally, the composite velocity string 37 is easier to transport in continuous lengths and requires fewer seams during installation than steel strings. This is especially advantageous in offshore wells, which previously required a heavy lift crane on a barge for installation of steel velocity strings.

Figure 4:
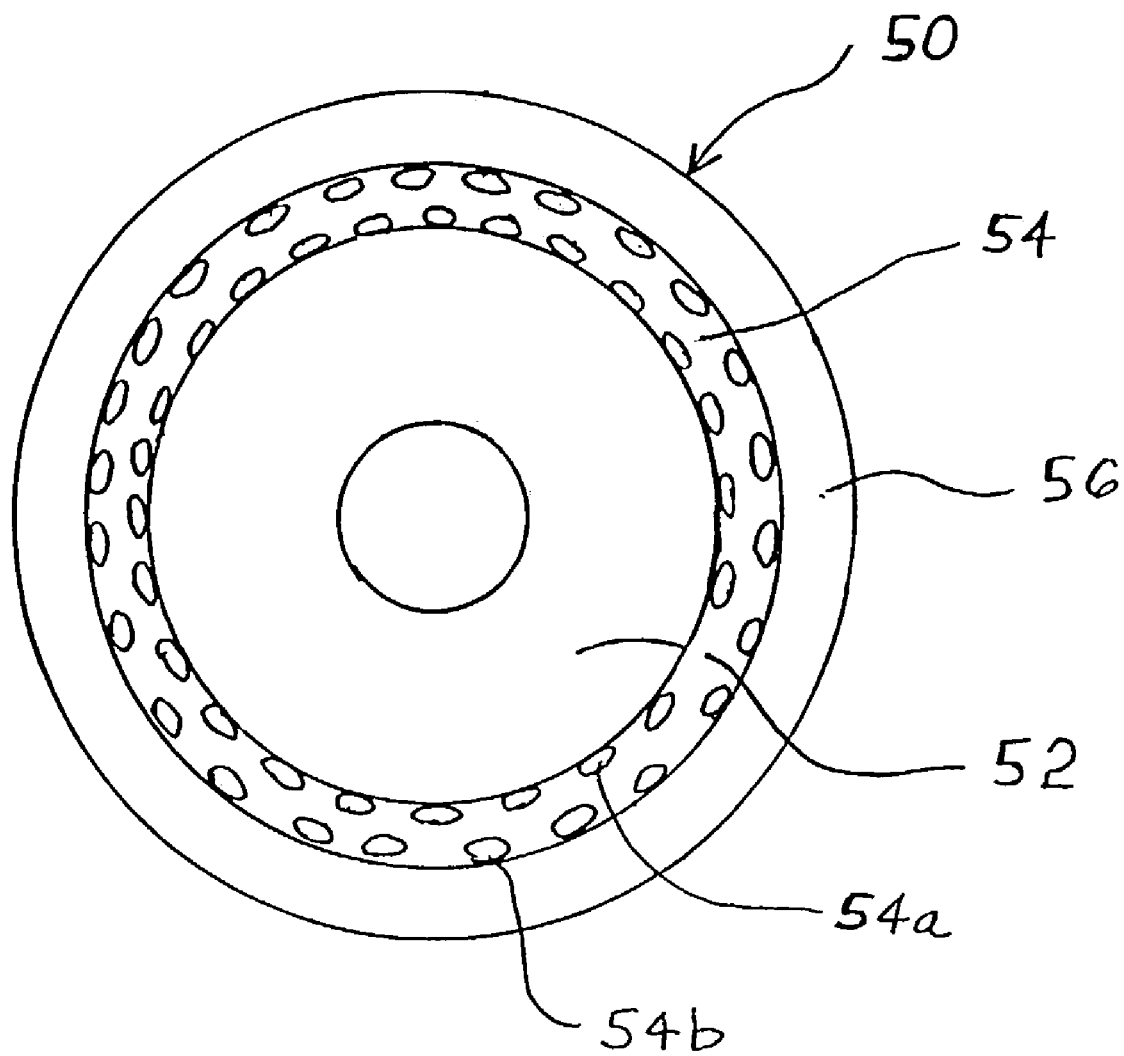
FIG. 4 is a cross-sectional view of a velocity string that is installed in a hydrocarbon well to increase production from the well in accordance with a further embodiment of the invention.

A composite velocity string 50 that is installed in a hydrocarbon well to increase production from in accordance with another embodiment of the invention is illustrated in FIG. 4. The composite velocity string 50 is similar to the velocity string 37 shown in FIGS. 1 and 2, except the inner tube 52 of the velocity string 50 shown in FIG. 4 comprises a single-layer extrusion instead of a multi-layer extrusion as shown in FIGS. 1 and 2. The velocity string 50 comprises a continuous tube of polymeric material 52, a layer of reinforcement fibers 54 surrounding the tube, and an outer jacket 56 surrounding the reinforcement fibers 54. The inner tube 52 may be formed from a thermoplastic material having good corrosion resistance, such as the polyphenylene sulfide material sold under the mark Fortron®, for use in corrosive environments. Alternatively, the inner tube 52 may be formed from a less expensive material having higher strength but lower corrosion resistance than polyphenylene sulfide, such as the polyamide material sold under the mark Nylon®, for use in non-corrosive environments. The inner tube 52 is preferably extruded as a continuous tube having sufficient flexibility so that it can be wound onto a commercial tubing reel. Preferably, the inner tube is about 0.050 to about 0.250 in. thick.

The outer jacket 56 is similar to the outer jacket 40 described above. Preferable, the outer jacket 56 is at least about 0.030 in. thick to prevent damage to the reinforcement fibers 54 during installation.

The reinforcement fibers 54 are similar to the reinforcement fibers 38 described above. The reinforcement fibers 54 include a plurality of axially-extending fibers 54a and a plurality of cross-braided fibers 54b.

The velocity string 50 is preferably co-extruded in the same manner as disclosed above, except the inner tube 52 is extruded as a single layer. Because the continuous tube 52 of the velocity string 50 does not include the binding layer 34, use of the velocity string 50 in accordance with this embodiment of the invention is not limited to environmental temperatures less than about 250° F. Therefore, the velocity string 50 has particular use in deep wells where the temperature exceeds 250° F. inside the well.

The present invention is not limited to the specific embodiments described above. Further modifications and extensions of the present invention may be developed and all such modifications are deemed to be encompassed within the spirit and scope of the present invention.

What is claimed is:

1. A method of increasing production from a hydrocarbon well having pre-existing production tube extending from the surface to the production zone, comprising the steps of:
   a) installing a composite velocity string having an outer diameter smaller than the inner diameter of the production tube so that an annular gap is formed between the outer surface of the velocity string and the inner surface of the production tube;
   b) reducing the coefficient of fluid flow friction through the composite velocity string compared to the coefficient of fluid flow friction of a steel velocity string;
   c) reducing the amount of heat loss through the composite velocity string compared to the amount of heat loss through a steel velocity string; and
   d) reducing radially-inward pressure on the velocity string.

2. The method recited in claim 1, wherein the composite velocity string is installed by inserting the velocity string along the length of the production tube and hanging the velocity string from the well head using a hanger.

3. The method recited in claim 2, wherein the velocity string is inserted using an injection tube unit.

4. The method recited in claim 1, including the step of reducing the amount of rust and scale formation on the interior of the velocity string compared to the amount of rust and scale formation in a steel velocity string.

5. The method recited in claim 1, including the step of reducing the amount of tar and asphalt that adheres to the interior of the composite velocity string compared to the amount of tar and asphalt that adheres to a steel velocity string.

6. The method recited in claim 1, including the step of reducing the amount of condensation that forms in the interior of the composite velocity string compared to the amount of condensation that forms in a steel velocity string.

7. The method recited in claim 1, wherein radially-inward pressure is reduced by isolating the annular gap from the production zone of the well.

8. The method recited in claim 7, including the step of installing a packer at the bottom of the velocity string to isolate the annular gap.

9. The method recited in claim 1, wherein said composite velocity string comprises:
   a) a continuous, extruded, polymeric tube; and,
   b) a layer of reinforcement fibers surrounding the tube including a first plurality of reinforcement fibers that extend both axially and radially, and a second plurality of the fibers that extends only axially.

10. The method recited in claim 9, wherein said polymeric tube comprises a multi-layer, extruded, tube, including an interior barrier layer comprising polyphenylene sulfide, an exterior support layer comprising polyamide, and an intermediate layer binding said interior layer and exterior layer to one another.

11. A method of increasing production from a hydrocarbon well having a pre-existing production tube extending from the surface to the production zone, comprising the steps of:
   a) providing a composite velocity string having an outer diameter smaller than the inner diameter of the production tube, said velocity string including:
      i) a continuous extruded, polymeric tube; and,
      ii) a layer of reinforcement fibers surrounding said tube including a first plurality of reinforcement fibers that extend both axially and radially, and a second plurality of the fibers that extend only axially; and,
   b) installing the velocity string in the production tube of the well.

12. The method recited in claim 11, wherein the composite velocity string includes an outer jacket surrounding the reinforcement fibers.

13. The method recited in claim 11, wherein the polymeric tube and said jacket are formed from a thermoplastic material.

14. The method recited in claim 13, wherein the thermoplastic material is selected from the group consisting of a polyamide material and a polyphenylene sulfide material.

15. The method recited in claim 13, wherein the polymeric tube and the jacket are formed from different thermoplastic materials selected from the group consisting of a polyamide material and a polyphenylene sulfide material.

16. The method recited in claim 11, wherein the first plurality of fibers are cross-braided.

17. The method recited in claim 11, wherein the tube comprises a multi-layer, extruded, composite tube, including an interior barrier layer comprising polyphenylene sulfide, an exterior support layer comprising polyamide, and an intermediate layer binding said interior layer and exterior layer to one another.

18. The method recited in claim 17, wherein the interior barrier layer comprises polyphenylene sulfide compounded with an ethylene/glycidyl methacrylate copolymer, the intermediate binding layer comprises ethylene/glycidyl methacrylate copolymer, and the exterior support layer comprises polyamide compounded with an ethylene/glycidyl methacrylate copolymer.

19. The method recited in claim 18, wherein the barrier layer comprises at least about 70 percent polyphenylene sulfide.

20. The method recited in claim 19, wherein the barrier layer comprises polyphenylene sulfide compounded with about 10 to about 30 percent ethylene/glycidyl methacrylate copolymer.

21. The method recited in claim 18, wherein the exterior supporting layer comprises at least about 70 percent polyamide.

22. The method recited in claim 21, wherein said exterior supporting layer comprises polyamide compounded with about 10 to about 30 percent ethylene/glycidyl methacrylate copolymer.

23. The method recited in claim 11, including the step of suspending the velocity string in the production tube using a hanger.

24. The method recited in claim 11, including the step of installing a packer near the bottom of the velocity string.

25. A well configuration, comprising:
   a) a subterranean well bore extending downwardly to a production zone of hydrocarbons;
   b) a production tube lining the bore;
   c) a composite velocity string installed along the length of the production tube down to the production zone, said velocity string comprising:
      i) a continuous extruded, polymeric tube; and,
      ii) a layer of reinforcement fibers surrounding said tube including a first plurality of reinforcement fibers that extend both axially and radially, and a second plurality of the fibers that extend only axially;
   d) a hanger suspending the velocity string in the production tube; and,
   e) an insulating annular gap intermediate the outer surface of the velocity string and the inner surface of the production tube.

26. The well configuration recited in claim 25, including a packer installed near the bottom of the velocity string.

27. The well configuration recited in claim 25, wherein the polymeric tube comprises a multi-layer, extruded tube, including an interior barrier layer comprising polyphenylene sulfide, an exterior support layer comprising polyamide, and an intermediate layer binding said interior layer and exterior layer to one another.

28. The well configuration recited in claim 25, wherein the polymeric tube comprises a single-layer, extruded tube formed from a thermoplastic material selected from the group consisting of a polyamide material and a polyphenylene sulfide material.

* * * * *